(12) United States Patent
Mohr et al.

(10) Patent No.: US 8,762,198 B2
(45) Date of Patent: Jun. 24, 2014

(54) METHOD AND SYSTEM FOR ASSIGNING BONUS-CREDITS TO THE USER OF PRODUCTS

(75) Inventors: Gunther A. Mohr, Hamburg (DE); Axel Jahns, Hamburg (DE)

(73) Assignee: Eppendorf AG, Hamburg (DE)

( * ) Notice: Subject to any disclaimer, the term of this patent is extended or adjusted under 35 U.S.C. 154(b) by 1177 days.

(21) Appl. No.: 10/941,637

(22) Filed: Sep. 15, 2004

(65) Prior Publication Data

US 2006/0059046 A1   Mar. 16, 2006

(51) Int. Cl.
*G06Q 30/00* (2012.01)
*G05B 19/418* (2006.01)

(52) U.S. Cl.
USPC ........................................ 705/14.27; 705/27.1

(58) Field of Classification Search
USPC .......................................................... 705/14
See application file for complete search history.

(56) References Cited

U.S. PATENT DOCUMENTS

| | | |
|---|---|---|
| 5,774,870 A | 6/1998 | Storey |
| 6,009,412 A | 12/1999 | Storey |
| 6,195,644 B1 | 2/2001 | Bowie |
| 6,330,543 B1 * | 12/2001 | Kepecs ...................... 705/14.17 |
| 2002/0103723 A1 * | 8/2002 | Platner et al. .................. 705/27 |
| 2003/0139996 A1 * | 7/2003 | D'Antoni et al. ............... 705/37 |

OTHER PUBLICATIONS

"Novation Signs Wound, Skin and Stoma Care Agreements". PR Newswire Association LLSOURCE. Novation. Apr 12, 2000.*

* cited by examiner

*Primary Examiner* — Victoria Vanderhorst
(74) *Attorney, Agent, or Firm* — Knobbe, Martens, Olson & Bear LLP

(57) ABSTRACT

The present invention relates to a method and a system for identifying, recording and processing data relating to a recipient and user of products and services obtained from a company, which runs a bonus program. In particular, he present method comprises assigning a code to products, that is transferred upon ordering the products into bonus-credits and is saved in the account of the user.

29 Claims, 4 Drawing Sheets

Diameter: 48 mm (+ tongue 53 mm)

2mm circumference white

Printing area in the middle : 24 mm

Fig. 1 Schematically view of the method steps

Diameter: 48 mm (+ tongue 53 mm)
Printing area in the middle : 24 mm

Diameter: 48 mm (+ tongue 53 mm)

2mm circumference white

Printing area in the middle : 24 mm

Diameter: 48 mm (+ tongue 53 mm)

2mm circumference white

Printing area in the middle : 24 mm

METHOD AND SYSTEM FOR ASSIGNING BONUS-CREDITS TO THE USER OF PRODUCTS

BACKGROUND OF THE INVENTION

1. Field of the Invention

The present invention relates to methods and a system for identifying, recording and processing data relating to a recipient and user of products and services ordered from a company, which runs a bonus program.

2. Description of the Related Art

Companies and/or vendors sell their products and services utilizing various marketing strategies, such as advertising, leaflets, catalogues etc., so as to inform the user of the availability of particular products, their degree of quality/purity and the price, to obtain continuous consideration by the potential customer. In addition, many companies offer their customers a variety of different discounts, rebates, coupons; extended warranties, and other purchasing incentives via so-called "loyalty programs". These programs may include means of different complexity, such as simple punch-cards or multi-partner retail plans. In principle, according to these programs a customer is awarded a certain bonus-credit for the purchase of a given product/service, which bonus-credit is recorded in an account assigned to the purchaser and which bonus may be used to obtain certain products or other services from the company or affiliated organizations.

The main objective of these loyalty programs is to increase "brand-loyalty" and customer retention, while also providing the offering company or organization marketing data on their consumer base.

Examples for these kind of programs are Frequent Flyer Programs offered by Air Lines or analogous programs offered by Hotel groups and Rental Car companies. According to other methods, modern forms of discounts are applied, which include an immediate credit at the time of purchase, a well known example for which is the so called pay-back card.

Systems and methods for offering such incentives are known in the art involving the registration of a consumer with a central host, where the consumer provides certain marketing data such as e.g. demographics, income, age, marital and family status, and occasionally also buying preferences. Companies and organizations also register with the central host, and offer targeted consumers purchasing incentives to purchase their products or services. In this respect, the offering companies are provided with the marketing data of the registered consumers.

U.S. Pat. No. 6,195,644 issued to Bowie describes a system for recording credits in loyalty programs offered by particular organizations directly by credit card companies. The credit card company used by the customers itself manages the bonus account of a particular customer with a given company, so that each purchase with the credit card immediately results in bonus points being awarded to the credit card holder by the given company, relieving the company of the burden of maintaining these records.

In U.S. Pat. Nos. 5,774,870 and 6,009,412, issued to Storey, a system is described, wherein the bonus points awarded to the customer on the basis of a sale may be redeemed for an award selected from an award catalog.

Yet, common to all of these programs is that the bonus-credit is awarded/given to the purchaser of the product/service. In fact, the bonus is awarded to the recipient of the invoice and not necessarily to the recipient of the products/services and relates to a particular order only.

Also the present systems are rather inflexible, in that they consider a low number of parameters only. In general, all persons staying in a hotel receive the same number of bonus-credits, those renting a car receive bonus-credits corresponding to the category of the car, and air travelers receive bonus-credits depending on the mileage. In these systems there is no incentive according to e.g. the region selected, the day of the week, the time of the day, the availability of the product etc.

In Life Science, products are most often ordered by individuals, that are not addressed in the invoice, e.g. people working in the laboratory, so that the purchaser is not identical to the recipient of the products/services. The products/services are generally sold via several places/distributors with the transactions including in general both, a huge number of different articles as well as a great number of the same article, so that a marketing department in the producing company normally does not have knowledge, who is the (end-) user of the product.

In these cases and based on the data of transaction, only the final vendors may have the possibility to track down the purchase up to the purchaser and the end-user, which does not apply to the producer of the goods. Hence, applying existing bonus programs to products of/services rendered in Life Science would not result in the bonus being credited to the actual user of the product/service.

Yet, it is a requisite for acquiring high loyalty to the company/the brand, to have direct contact to the user. The knowledge of the user would also offer the opportunity for the company to support him/her in the purchase or offer him/her other benefits of the producing company. The knowledge about the user also includes additional immediate advantages. Since in Life Sciences the user sometimes has to work with dangerous and/or toxic substances, it is beneficial to be able to directly contact the user in case of emerging problems.

In case of handing out goods via distribution channels, including different storage departments and -systems, it is burdensome, difficult and above all quite costly to obtain the corresponding data. Inputting the data of the user by the sales-man in the last step of the purchase also is quite complicated. The costs of such determination mainly reside in the extensive number of goods to be inputted, especially for goods of mass consumption, their relative low value and the high number of customers. The companies also require extensive security means, so as to avoid abuse of the data collected. This adds to the costs involved.

SUMMARY OF THE INVENTION

It is an object of the invention to provide a method for identifying, recording and processing data relating to a recipient and end-user of goods and services purchased from a company, so that the bonus may be credited directly to him.

It is another object of the invention to provide more substantial data about the user of goods sold via a multifactoral distribution system.

It is an additional object to provide a system for processing data obtained from an individual enrolled in a bonus program such that even though the user and purchaser are not identical data elating to the user of the product may be obtained.

BRIEF DESCRIPTION OF THE DRAWINGS

The invention will now be described with reference to the accompanying drawings, in which, FIG. 1 schematically shows the steps of the present method.

DETAILED DESCRIPTION OF THE PREFERRED EMBODIMENT

Figure 1:
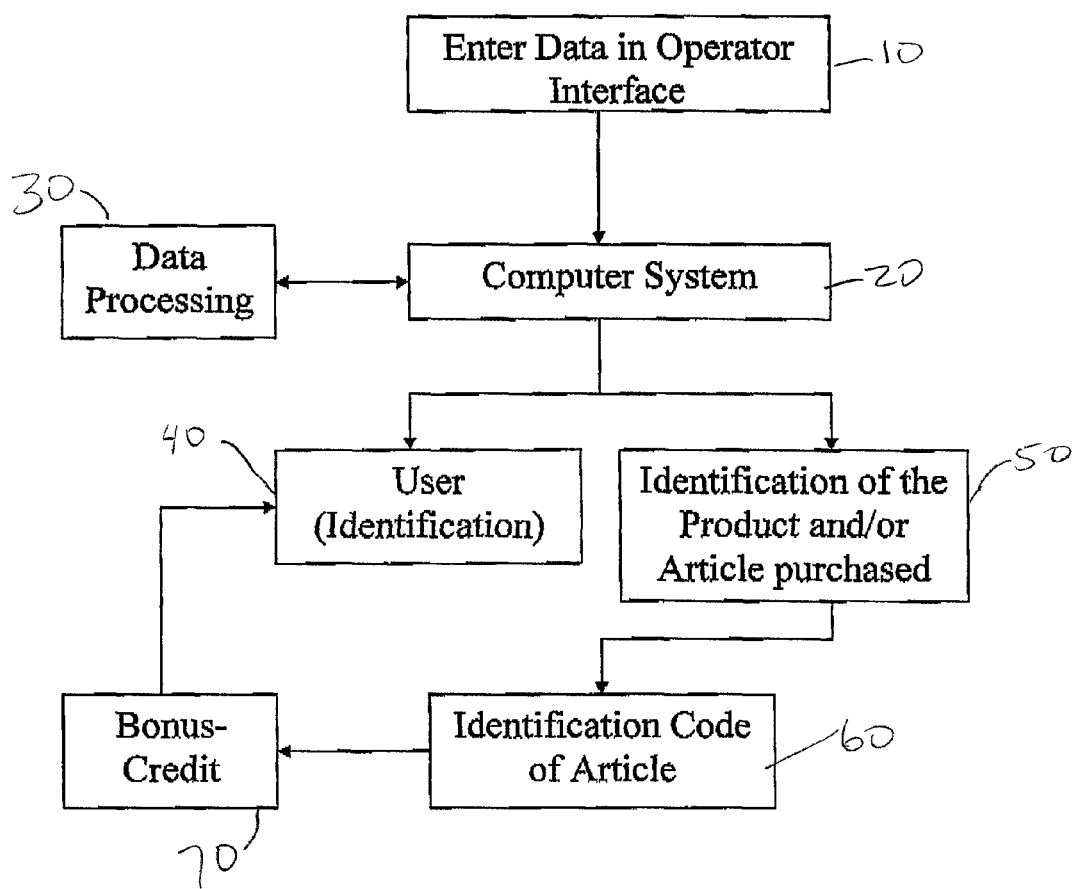

Referring to FIG. 1, in one embodiment, a method for processing a transaction of a user of ordering products and/or services from a company for assigning bonus-credits directly to the user of the products/services comprises the steps of entering data 10 in a computer system 20 indicative of the user 40 and the products and/or services 50 purchased, wherein to each product/service 50 is assigned a code 60 identifying the article purchased and indicative of the bonus-credits 70 to be awarded, processing the data 30 in a computer system 20, and assigning a sum of bonus-credits 70 calculated on the basis of the code(s) 60 to an bonus account of the user 40.

The invention essentially resides in modifying existing bonus-credit-systems in a way, so as to substantially improve their accuracy, reliability and efficacy. This is achieved by means of a software and a computer system 20 that ensures, after a recipient/user 40 of products/services 50 offered by the company has enrolled with the company in a bonus program, that the recipient transfers data to the company of the purchase and concurrently the code(s) 60 of articles purchased and optionally other data, wherein this code 60 is immediately transformed into bonus-credits 70 and stored in a bonus account of the recipient/user 40 of the products/services 50. The recipient/user 40, the company and other participants of the marketing system periodically, or upon request, receive statements, either online, electronically or on paper, about the bonus account.

The invention essentially includes step that each article is marked with a code 60 that may not be falsified, so that it may be input online into a computer system 20 of the company or a vendor in the distribution line, so that the company may directly credit a given bonus 70 to a particular user 40, once the user's data are known. The producer of the products 50 may, based on the code(s) 60 submitted in conjunction with the data provided by the user 40, track down the products/services 50 up to the actual recipient and (end-)user 40, and is therefore in a position to contact said recipient/user 40 and to award the bonus-credits 70 directly to him.

As the code 60 to be used in the present invention any conventional coding means may be envisaged, which code 60 but must, however, be sufficient to exclude falsification and/or detection. Normally the code 60 is entered in an address field comprising 10 characters or more, which characters are selected from letters and numbers and also special characters, such as brackets etc. According to a preferred embodiment the code 60 comprises a mixture of letters and numbers and also in case special characters.

In addition, the invention also includes that the recipient/user 40 may be credited bonuses 70 for all the products/services 50 he received from the company and may be provided with a consolidated list of bonuses 70. This list may also be used within the company to acquire data with respect to geographic or demoscopic terms, so as to use it in view of marketing and business strategic plans. The data gathered in this way may also be processed 30, so that a chart about the user 40 may be plotted, which may be used for individually addressing the particular user 40.

The present system offers a number of benefits for both, the vendor and the user 40 of the product 50.

On the one hand, the company may increase brand loyalty of the end-user 40 of a product/service 50, that normally decides on the article to be purchased, without substantially increasing costs for data input, accounting or providing additional computers. Also, the company now has immediate access to data of the end-user 40 of the products 50 that have not been available so far. Since the present method may be run on existing systems, the company saves costs for implementing an altered system of data input and transfer, calculation of bonus-credits 70 and information derived therefrom. In addition, the company may improve its marketing instruments without considerable efforts and thus control and monitor sales, so as to increase business. In particular, since the bonus 70 is calculated and stored based on a code 60, the said code 60 may be stored concurrently, allowing an easy access to the data, which kind of products 50 that particular user 40 has ordered in a given period of time. At the same time, the marketing department may easily realize, when and where which kind of products 50 need support for their sale.

According to the present method the end-user 40 of the product benefits from the bonus-credits 70 awarded, which is an incentive for him to stay with the company/vendor and to continue to preferentially buy from the company/vendor. The opportunity to receive the bonus-credit 70 online, i.e. at the same time of dispatching the order, allows for an optimization of his needs inclusive bonus-credits 70, and to save costs. For the company there is no need to track down the way of the good from the date of purchase to the end-user 40, which saves costs in the administrative sector.

According to one illustrative embodiment of the invention, a user 40 of a product 50, such as the head of a laboratory or other laboratory personal, registers his membership in a loyalty program with a bonus management system, run by the company or an external provider, which maintains this information in a secured interactive database.

The user/member 40 of the bonus program once registered submits a query about available products and/or services 50 for a purchase by entering data 10 into a computer system 10 indicative of the user 40 and the products and/or services 50 to be purchased. The query may be submitted via an interactive Internet web site run by the company or a provider or via a Local Area Network, wherein the operator interface is a personal computer, a workstation or a dummy terminal.

The query includes data of the end-user 40, which may preferably be represented by his/her identification in the bonus program and is submitted together with the order for the products 50. To the products 50 ordered a code 60 is assigned identifying the article at least with respect to the bonus system.

Thus, in principle it may be envisaged that the article code 60 used for the order of the product 50 may be utilized itself for the code 60 and is representative for the respective bonus-credits 70. However, according to a preferred embodiment, to the different articles a code 60 is assigned different from the article order coding, which alleviates calculation of the bonus 70. According to a straightforward embodiment the code 60 corresponds to the number of bonus-credits 70 assigned to a given product 50, e.g. is 1, 5, 10 or 100.

The order and the code 60 of the product 50 is submitted in conjunction with the registered membership of the user 40.

The system processes 30 the query according to the rules and conditions entered in the system. These rules may include transferring the data obtained into orders to be submitted to the storage and accounting department while at the same time, transforming the code(s) 60 received into bonus-credits 70 and calculating the bonus-credits/points 70. The calculated and added up bonus-credits/points 70 are immediately transformed into the account of the registered user 40.

The invention preferably comprises a host data processor which houses and operates the system managing and processing the query, i.e. one or more data processing systems capable of storing information relating to the consumer and bonus program information, and receiving and processing queries for products and/or services 50 submitted by a user 40. The query management system may also include data as regards the incentives for the user 40, and provides marketing data to the company. The system is connected by telecommunications links to one or more user 40 computers and optionally offering companies' and organizations' computers. The management system is conducted over the Internet via any direct or remote link, or over an Intranet, from a dedicated terminal connected to the host data processor, or over conventional telephone systems. Alternatively, the system could be conducted in stand alone systems, through the use of software programs, with communications with the host computer conducted e.g. over conventional telephone lines e.g. via modem.

According to a preferred embodiment, the query management system host processor and the consumer and other offering companies and organizations computers, e.g. in the distribution line, communicate over the Internet via a direct Internet connection, a dial-up Internet connection, a dial-in server access, an ISDN digital line, a LAN connection, a wide area network, an Ethernet connection, a DSL connection or any other wired or wireless connection. The query management system data processor preferably includes a server computer, with the computers run by the users etc. may operate commercially known web browsers, such as Microsoft Explorer or Netscape Navigator. Information between the end-user 40 of the products/services 50 and other companies in the distribution line and the query management system server computer 20 may be transferred via the Internet according to any of several known Internet protocols, including HTTP and FTP.

On the query management system server computer run by either the company itself or an offering company an operating system is installed that allows the management system to control various applications, including management, retrieval and storage of data in a database, web browser and communications. The server computer is programmed, to conduct the query management system and also comprises standard devices as RAM, ROM, hard drive, I/O devices, graphical displays, printers, and communications devices as modems.

The user 40 of a product/service 50 of the company enrolls in the bonus program via the management system by providing required information to register, such as e.g. the name, age, position in the company but also demographic data, financial data, marital and family status, and buying preferences. This information will be stored in the database, and is secured and searchable. The consumer will receive or may select a free registration number/name and/or password for future identification, and will be granted access to the management system upon input of this registration number/name and/or password according to conventional authorization procedures.

When a registered consumer desires to order products and/or services 50 from the company, he/she will contact the query management system using the web browser implemented on his/her computer. According to an alternative embodiment, the user 40 may also contact the query management system over conventional telephone lines, e.g. via a toll free or a pay to dial number, wherein the query management system processor may be accessed via Interactive Voice Response techniques. If desired, the connection may be secured, using known protocols.

The user 40 inputs his/her registration number/name for identification. When the querying user 40 is authenticated he will be allowed to enter the identification number/names of the articles to be purchased. This information is received by the query management system where it may be stored in a database, which is secure and searchable. The data may also be displayed together with features of the products 50 ordered and/or incentives of the bonus programs.

The query management system host computer may access the query database, and search for the rules and conditions of the loyalty programs. In this respect each article purchased is linked with a code 60, representative for a certain bonus-credit 70, so that the system may process/transform the code 60 directly into bonus-credits/points 70 and immediately transfer the sum to a bonus account assigned to the identification number/name of the user 40. Using a code 60 assigned to particular products 50 allows to flexibly assign bonus-credits/points 70 to an article depending e.g. on the amount of products/services 50 purchased or depending on the user 40.

The data contained in the bonus account may be retrieved by the user 40 at any desired time and/or will be provided after a certain period of time by the company. In addition, the company will be able to have access, apart from the data stored in the bonus account, to other data entered 10 by the user 40 upon registration. This information may be provided anonymously to each department within the company so as to merely indicating e.g. the region or the purchasing company, in which the user 40 ordering the products 50 is employed, or may be provided together with selected demoscopic data.

The user 40 may at any time use the bonus-credits/points 70 in his/her bonus account to ask for the reimbursement for the credits/points. This may be effected in form of an ordinary order, wherein the bonus-credits/points 70 are used for ordering products/services 50 offered by the company itself, or may be used for ordering articles, the company does not produce but offers in this respect.

In an alternative embodiment the present invention also relates to a system for processing 30 purchasing transactions of a user 40 of products and/or services 50 so as to assign bonus-credits 70 directly to the end-user 40 of the products/services 50. The system comprises as an essential component at least one interface unit with which information from a user 40 may be received relating to the user's 40 membership in a company's loyalty program, and with which also queries for purchasing products 50 from the company may be received. In addition, the system comprises at least one data processor which is operatively connected to the at least one interface unit and which is capable of processing the query. The at least one interface unit may transform/transfer the code 60 assigned to the products 50 purchased into bonus-credits 70, and is capable to store said data in a file allocated to the user 40. In addition the interface may also be capable to display the bonus-credit 70 awarded to the user 40.

According to a preferred embodiment the system further comprises at least one interactive database operatively connected to the at least one interface unit and capable of storing at least some information received from the user 40 and being searchable to retrieve at least some information received from the user 40. The at least one interface unit may also be capable of transmitting the query to at least one computer of the storage department and receiving a response from the storage department relating to the availability of a product 50 ordered.

According to an alternative embodiment the present invention also relates to a computer readable medium which includes a program executing steps for awarding bonus-credits 70 to a product-user 40 based on a code 60 assigned to the product 50, the program execution comprising, identifying and authenticating a user 40; receiving and processing 30 an order entered 10 by the user 40; separating the code 60, assigned to each article in the order; calculating the bonus-credits/points 70 based on the code 60; and storing the bonus-credits 70 in a file.

According to yet another alternative embodiment the present invention also encompasses a computer data signal embodied in a carrier wave and representing a program that instructs a computer to perform steps for awarding bonus-credits 70 to a product-user 40 based on a code 60 assigned to the product 50, the program execution comprising, identifying and authenticating a user 40; receiving and processing 30 an order entered 10 by the user 40; separating the code 60, assigned to each article in the order; calculating the bonus-credits/points 70 based on the code 60; and storing the bonus-credits 70 in a file.

It is to be understood that the embodiments and variations shown and described herein are merely illustrative of the principles of this invention and that various modifications may be implemented by those skilled in the art without departing from the scope and spirit of the invention.

EXAMPLE

A potential purchaser of an Eppendorf pipette may contact the system server run by the Company via the Internet. The website of the Company offers the user 40 the possibility to register either as a mere customer or also as a member of a bonus program. The potential purchaser may select to register as a member of the loyalty program in the system, which entails that a secure SSL session may be initiated between the company's system server and the potential customer's web browser. The consumer may enter 10 personal information such as name, address, telephone number, e-mail address, but also relevant marketing information, such as age, income, profession, marital status etc.

The information entered into the system may be stored in a file, which may be indexed by a user 40 identifying number assigned by the system. Subsequently, the user 40 may be asked for selecting a user 40 name and a PIN or password all of which are verified to be unique within the system. After having completed to enter the required data, the user 40 may log off and end the secure SSL session.

When trying to submit an order for an Eppendorf pipette, the user 40 will access the company's web site and log in with his/her personal identification and/or PIN. Once authenticated via his/her user 40 name and the PIN or password as an enrolled member of the bonus program the query management system on the company's server may initiate a secure SSL session. The user 40 may now enter 10 the data or article number, respectively, of the product 50 to be purchased.

Together with the data of the product 50 to be purchased, the company's query management system receives the code 60 assigned to the product 50 and indicative of the bonus 70, the user 40 will receive upon purchase. The query management system may now process 30 the order data in a conventional way and may at the same time process the code 60 received in the order to transform/transfer the code 60 into bonus-credits/points 70 and to store the bonus-credits/points 70 in the bonus account assigned to the user 40.

After having submitted the order, the user 40 may have a look into his bonus account and may immediately see the sum of bonus-credits/points 70 awarded from this or previous purchases.

Figure 2:
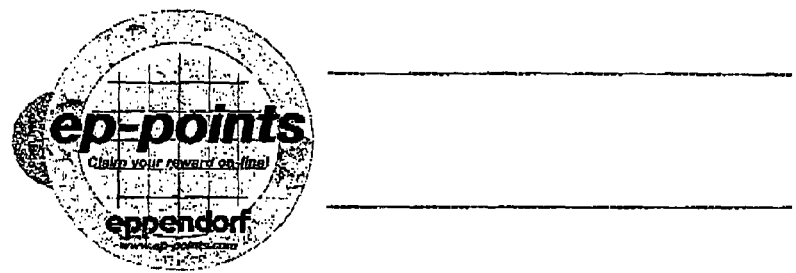
FIGS. 2 a) to 2c) show logos for the bonus systems.
Figure 2:
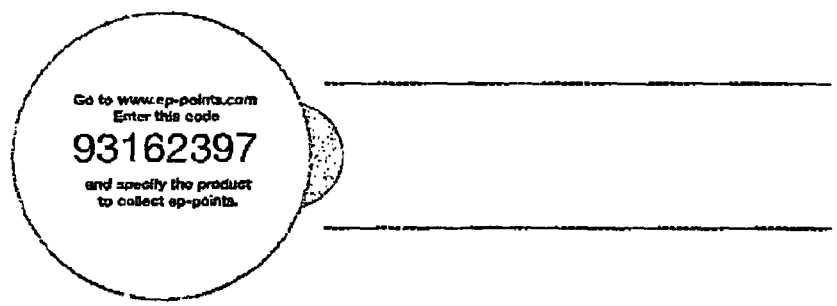
Figure 2:
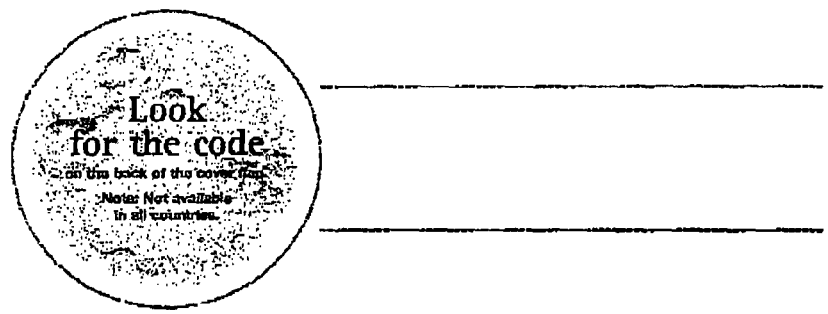

FIGS. 2 *a*) to 2*c*) show logos for certain bonus systems.

The invention claimed is:

1. A method of processing a purchasing transaction of a user of a product to assign bonus-credits to a bonus account of the user of the product, the method comprising:
    a) entering, via an operator interface in a computer system, data for the purchasing transaction, the transaction data identifying an entity receiving an invoice for purchasing the product, the user of the product, and the product, wherein the product is assigned a bonus-credit based on a bonus-credit code associated with the product, and wherein the entity receiving the invoice for the product and the user of the product are different entities and wherein the transaction data regarding the product is different than the bonus-credit code associated with the product;
    b) processing the transaction data and the bonus-credit code associated with the product in a computer system so as to purchase the product; and
    c) in response to processing the transaction data associated with the product, concurrently transforming the bonus-credit code associated with the product into the bonus-credit and assigning the bonus-credit to the bonus account of the user, wherein the bonus-credit code is not interpretable by the user.

2. The method according to claim 1, wherein said operator interface is a personal computer.

3. The method according to claim 1, wherein said operator interface is a workstation.

4. The method according to claim 1, wherein said operator interface is a dummy terminal.

5. The method according to claim 1, wherein the computer system is a computer server.

6. The method according to claim 5, wherein the computer system is run by the company selling or producing the products/services ordered by a user.

7. The method according to claim 1, wherein the transaction data are entered in the computer system via a distributed network.

8. The method according to claim 7, wherein the distributed network is the Internet.

9. The method according to claim 7, wherein said distributed network is a Local Area Network.

10. The method according to claim 7, wherein said distributed network is a Wide Area Network.

11. The method according to claim 1, wherein the data identifying the user of the product comprises demographic data.

12. The method according to claim 1, wherein the bonus-credit code is entered in an address field comprising 10 characters or more.

13. The method according to claim 12, wherein the bonus-credit code comprises letters, numbers, characters or any mixture thereof.

14. The method according to claim 1, wherein processing the transaction data comprises transmitting text, image and/or videos to the user illustrative of features of the product.

15. The method according to claim 14, wherein the features of the product comprise product availability information.

16. The method according to claim 1, wherein processing the transaction data comprises displaying to the user, at the time of order, the bonus-credits assigned.

17. The method of claim 1, wherein the bonus-credits are displayed to the user upon request.

18. The method according to claim 16, wherein the displaying of the bonus-credits comprises displaying products to be received for the bonus-credits.

19. The method according to claim 1, wherein the data identifying the user are used in conjunction with bonus-credit data by a marketing department of the company.

20. The method according to claim 1, additionally comprising repeating a), b) c) and d) for each of different products having different bonus-credit codes, wherein an accumulated total of the bonus-credits for all the products ordered is immediately entered into the bonus account of the user after the processing of the transaction data.

21. The method according to claim 1, further comprising storing the bonus-credit code and accessing data representative of products that a particular user has ordered in a given period of time based on the bonus-credit code.

22. A system of processing a purchasing transaction of a user of a product to assign bonus-credits to a bonus account of the user of the product, wherein the user of the product is a member of a loyalty program of a company selling the product, the system comprising:
   a) at least one interface unit configured to receive information for the purchasing transaction, the received information relating to an entity receiving an invoice for purchasing the product, the user's membership in the loyalty program, and a query for purchasing products from the company, wherein the entity receiving the invoice for the product and the user of the product are different entities, and wherein the query includes a product identifier; and
   b) at least one data processor operatively connected to the at least one interface unit which is capable of processing the query;
   wherein the at least one interface unit is configured to assign a bonus-credit to the bonus account of the user based on transforming a bonus-credit code associated with the products concurrently purchased, to store data related to the transaction, and in response to receiving the information to display the bonus-credit assigned to the bonus account of the user, and wherein the product identifier is different than the bonus-credit code, and wherein the bonus-credit code is not interpretable by the user.

23. The system according to claim 22, further comprising at least one interactive database operatively connected to the at least one interface unit, wherein the database is configured to store at least some information received from the user and is searchable to retrieve at least some information received from the user.

24. The system according to claim 22, wherein the at least one interface unit is capable of transmitting the query to a storage department and receiving a response from the storage department relating to the availability of the product.

25. The system of claim 22, wherein processing the query further comprises determining whether one or more incentives are available as a result of the transaction.

26. The system according to claim 22, wherein the at least one interface unit is configured to utilize the bonus-credit code associated with the products to selectively assign a different bonus-credit depending on a plurality of factors.

27. The system according to claim 26, wherein the plurality of factors comprises an availability of the products and a selected geographic region.

28. A non-transitory computer readable medium that includes a program which, when executed, causes the computer to perform a method of processing a purchasing transaction to award bonus-credits to a bonus account of a user of a product based on a bonus-credit code assigned to the product, the method comprising:
   identifying and authenticating the user and an entity receiving an invoice for purchasing the product, wherein the entity receiving the invoice for the product and the user of the product are different entities;
   receiving and processing an order from the user; and
   concurrently, in response to the order:
      identifying the bonus-credit code assigned to the product;
      transforming the bonus-credit code assigned to the product into bonus-credits;
      and
      storing the bonus-credits in the bonus account of the user,
      wherein the bonus-credit code is not interpretable by the user.

29. The computer readable medium according to claim 28, wherein the order includes a product identifier, and wherein the product identifier is different than the bonus-credit code.

* * * * *